United States Patent [19]

Miller et al.

[11] Patent Number: 4,663,854
[45] Date of Patent: May 12, 1987

[54] TAPE MEASURE WITH LOCK BUTTON

[76] Inventors: Randy Miller, 119 E. 67th, Box 6083, Shreveport, La. 71136; Ken Veverka, 102 Wicker Ct., Charleston Hgts., S.C. 29418

[21] Appl. No.: 885,334

[22] Filed: Jul. 11, 1986

Related U.S. Application Data

[63] Continuation-in-part of Ser. No. 622,683, Jun. 20, 1984, abandoned.

[51] Int. Cl.⁴ .......................... G01B 3/10; B65H 75/48
[52] U.S. Cl. ...................................... 33/138; 242/84.8; 242/107.3
[58] Field of Search .......................... 33/138, 139, 140; 242/84.8, 107, 107.3, 107.2, 107.15

[56] References Cited

U.S. PATENT DOCUMENTS

| | | | |
|---|---|---|---|
| 2,728,143 | 12/1943 | Buchet . | |
| 3,435,529 | 4/1969 | Quenot | 33/138 |
| 3,698,004 | 9/1972 | Brown et al. . | |
| 3,716,201 | 2/1973 | West . | |
| 4,194,703 | 3/1980 | Roe | 242/107.3 X |
| 4,449,302 | 5/1984 | Drechsler | 33/138 |

FOREIGN PATENT DOCUMENTS

| | | | |
|---|---|---|---|
| 2100307 | 7/1972 | Fed. Rep. of Germany | 33/138 |
| 21034 | 3/1966 | Japan | 33/138 |
| 253421 | 6/1926 | United Kingdom | 33/138 |
| 1192683 | 5/1970 | United Kingdom | 242/84.8 |

Primary Examiner—Harry N. Haroian

[57] ABSTRACT

A tape measure includes a housing having first and second half and a bottom access door which is openable to provide an access port to the interior of the housing. A spool is rotatably mounted upon an axle which has an integrally formed ratchet plate. The ratchet plate engages ratchet teeth that are integrally formed within the interior surface of the housing to provide for rotation of the axle to load a spring within the spool to a desired tension. The ratchet teeth normally prevent rotation of the axle to unload the spring tension. An overriding mechanism allows the axle to axially move to disengage the ratchet plate from the ratchet teeth to provide for rotation of the axle to unload the spring mechanism. A lock button has a thumb operating section at the top portion of the housing and has a pressure regulating section which regulates the pressure that the bottom end of the lock button exerts against the tape.

11 Claims, 13 Drawing Figures

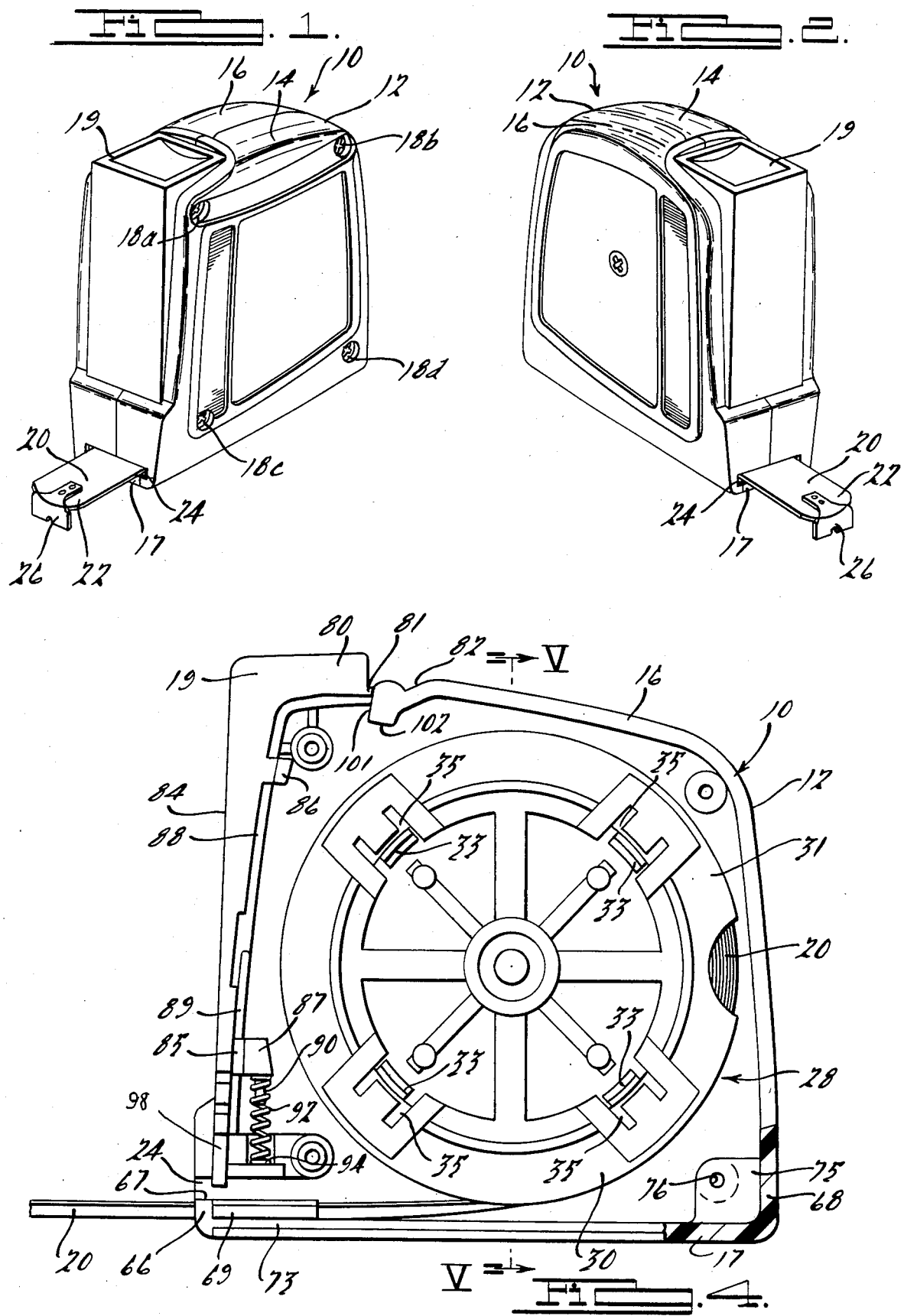

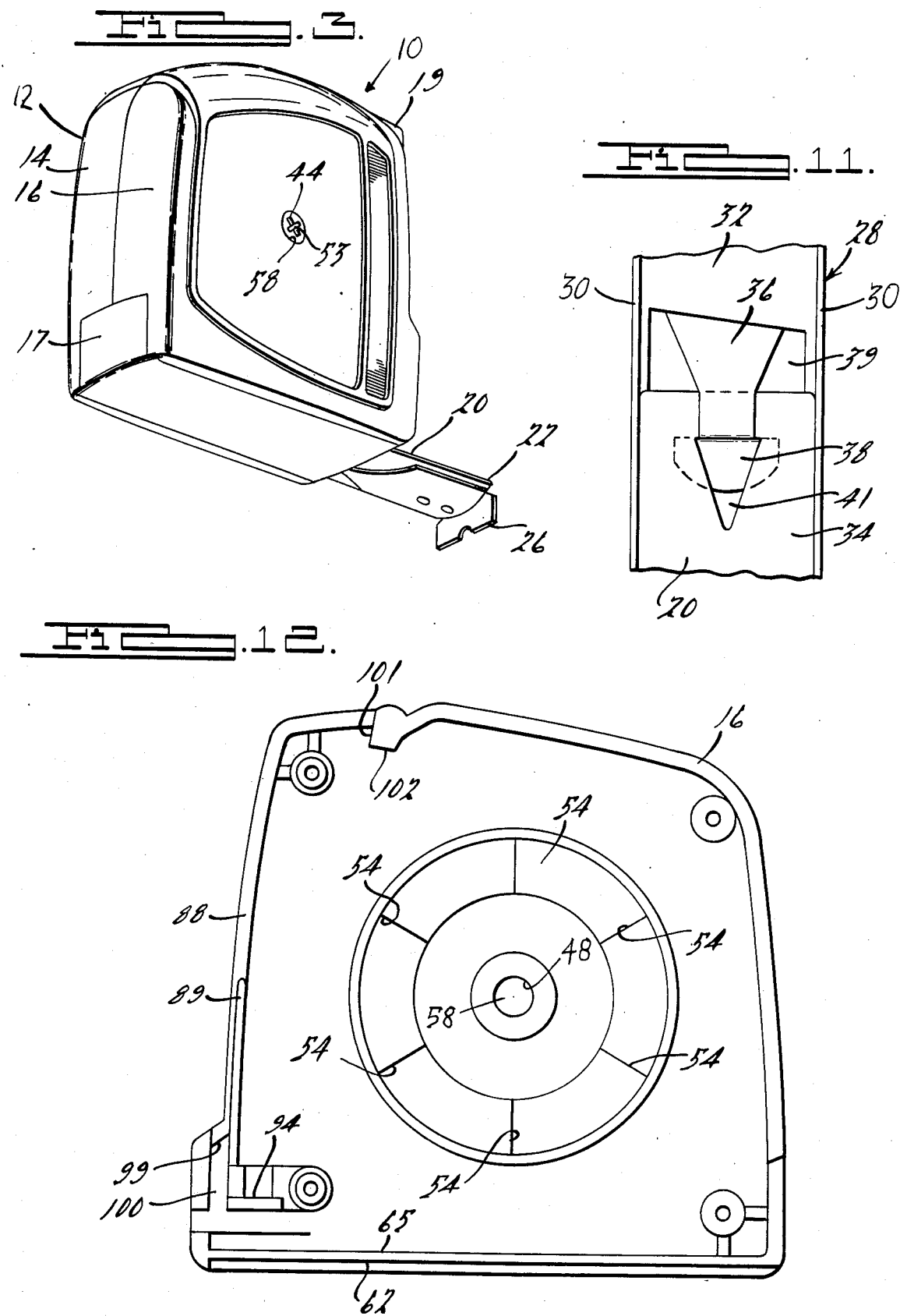

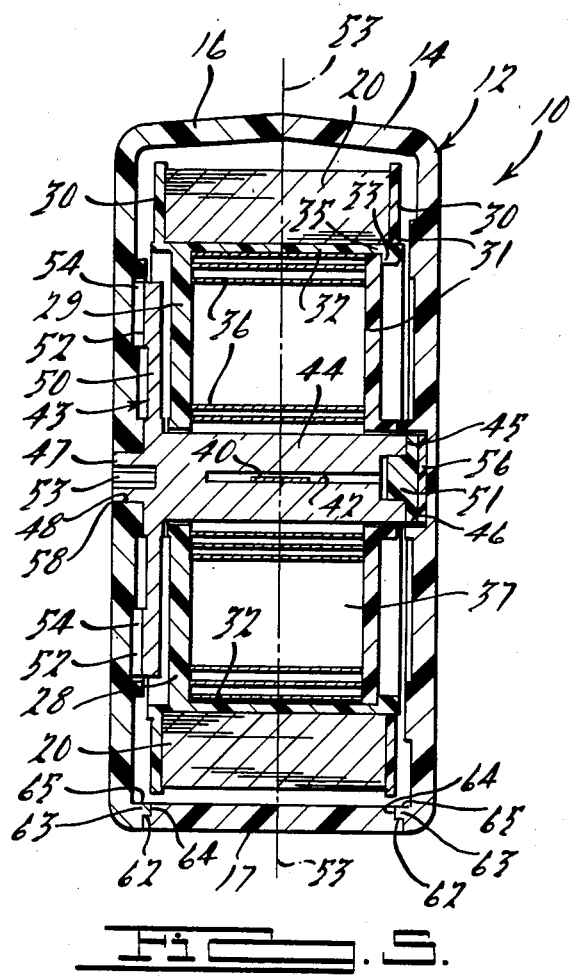
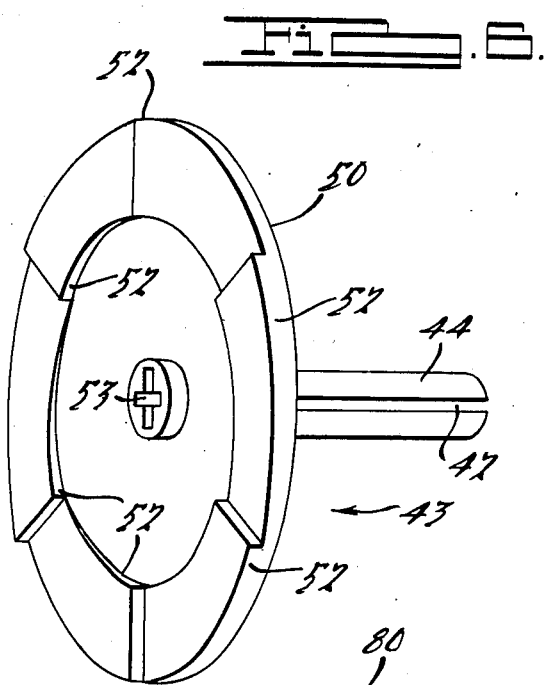
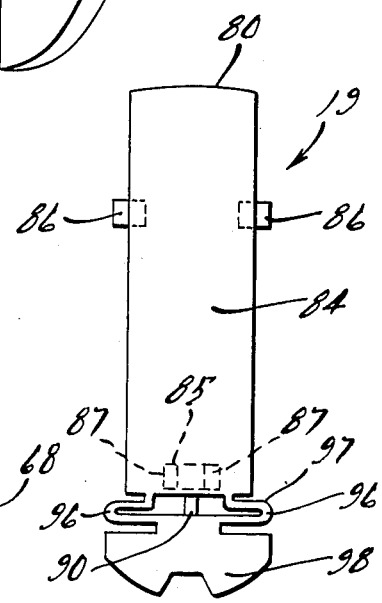
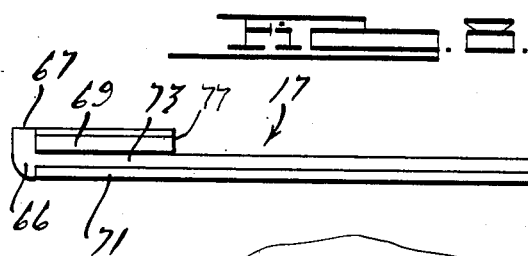
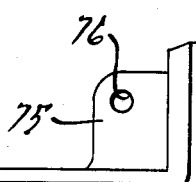
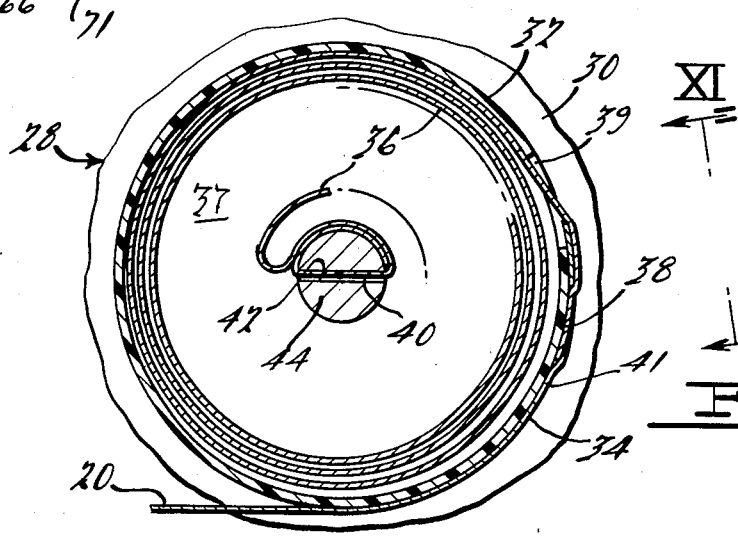
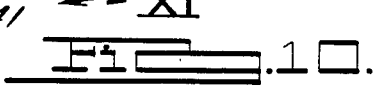

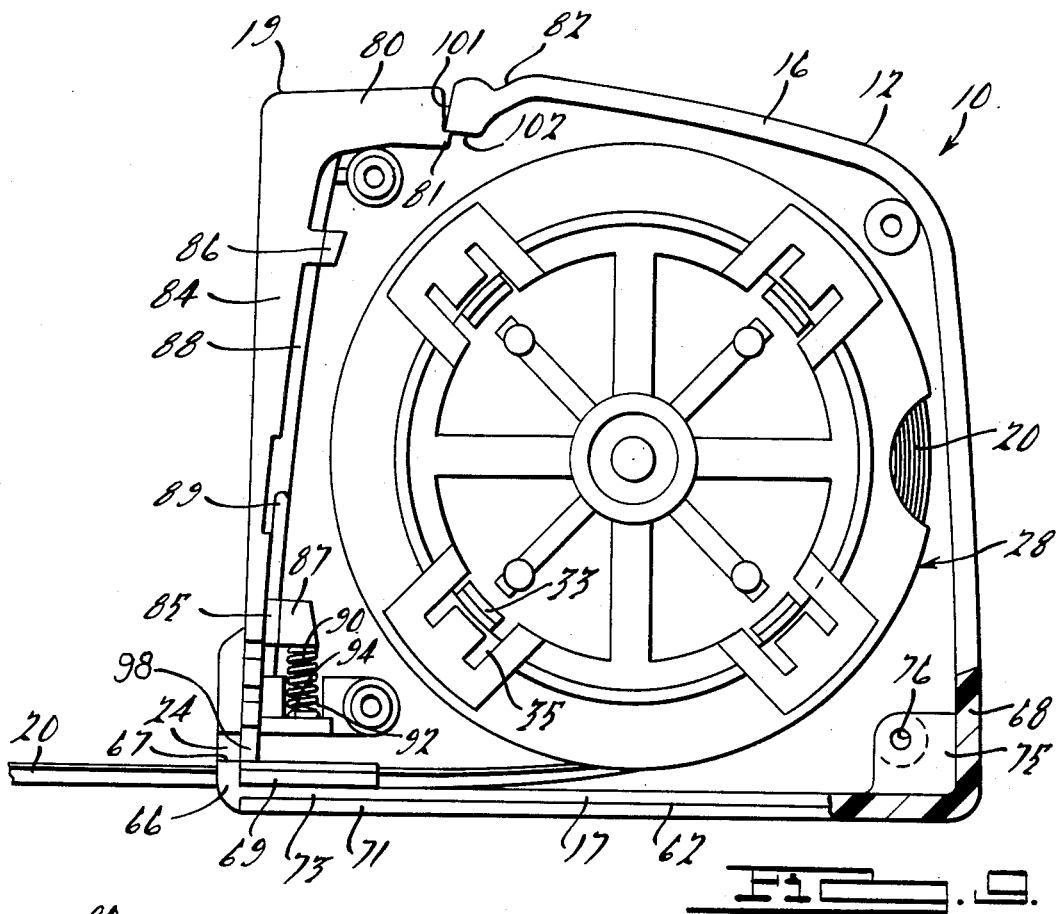

breaks in another fashion, the tape 20 recedes into the interior of the housing and allows the spool 28 to rotate (counterclockwise as shown in FIG. 13) to unload the spring 36. The tape cannot be easily retrieved until access to the interior is easily achieved. In this fashion, the lower right hand screw 18d can be removed and the access door 17 slid to the open position to increase the size of slot 24 to form access port 18 as described before. At this point, the tape end 22 can be easily grabbed and pulled back out from the housing interior. The access door is then reclosed and resecured with screw 18d while the tape end 22 is held. The tape is now pulled to totally unwind the tape 20 from spool 28 until the inner end 34 can be grabbed and disengaged from the tab end 38 of spring 36. The tab end 38 is maintained in position by insertion of a nail or similar object placed in hole 35. A new tape can have its inner end reattached to the tab end 38. At this point, a rewind tool can engage aperture 58 to crank the adjustment member 43 in a clockwise direction as shown in FIG. 3 until the spring is fully wound. A new tape 20 is then attached to tab end 38 and the nail is removed from hole 35. The new tape 20 is then free to rewind onto spool 28. The tape measure is then free to be used in its normal fashion.

In this fashion, reparable tape measure has an access port which allows easy access to the tape. More particularly, the slot 24 can be enlarged upon the sliding of the access door. Furthermore, the tape can be replaced without removal of the tape spool from its rotatably mounted position. In addition, an adjustment mechanism allows the spring to be correctly retensioned for the replacement tape. The lock button 19 is positioned to provide for comfortable and easy use in locking and releasing the tape.

Variations and modifications of the present invention are possible without departing from its scope and spirit as defined by the appended claims.

The embodiments of the invention in which an exclusive property or privilege is claimed are defined as follows:

1. A tape measure characterized by:
   a housing having a tape receiving slot therein;
   a tape passing through said slot;
   tape receiving means mounted in said housing for receiving said tape; and
   a lock means normally biased towards an upper release position for releasably maintaining said tape in a fixed position through said slot, said lock means having an operable button at the top of said housing, said button vertically slidable between said upper release position and a lower lock position, said operable button integrally formed with a vertically slidable wall portion having means engaging said tape and forming a section of the exterior wall of said housing.

2. A tape measure as defined in claim 1 further characterized by:
   spring means for biasing said lock means to a release position;
   engagement means for releasably retaining said lock means in a position to fix said tape against the bias of said spring means;
   guide means at the side of said wall portion for retaining said lock means with said housing when said lock means is in said release position or said lock position.

3. A tape measure as defined in claim 2 further characterized by:
   said engagement means includes complementary shoulders on said lock means and on said housing.

4. A tape measure as defined in claim 2 wherein said guide means includes;
   a first and second extension extending from a depending wall of said button;
   said extension having flanges that engage a forward shoulder of said housing.

5. A tape measure as defined in claim 1 further characterized by:
   said lock means comprises the front wall of said housing.

6. A tape measure characterized by:
   a housing having a tape receiving slot therein;
   a tape passing through said slot;
   tape receiving means mounted in said housing for receiving said tape; and
   lock means forming a portion of the vertical front wall of said housing for releasably maintaining said tape in a fixed position through said slot, said lock means having an operable button at the top thereof and extending through the top of said housing for slidably moving said lock means between an upper release position and a lower lock position, wherein said lock means includes:
   a wall portion forming a section of the exterior wall of said housing, said wall portion integral with said operable button;
   spring means for biasing said lock means to said release position;
   engagement means for releasably retaining said lock means in a position to fix said tape against the bias of said spring means; and
   guide means at the sides of said wall portion for slidably retaining said lock means with said housing when said lock means is in said release position and said lock position.

7. The tape measure as defined in claim 6 wherein said engagement means includes complementary shoulders on said lock means and on said housing.

8. The tape measure as defined in claim 6 wherein said guide means includes first and second extensions extending from the sides of said wall portion of said lock means, said extensions having flanges that engage a forward shoulder of said housing.

9. A tape measure characterized by:
   a housing having a tape receiving slot therein;
   a tape passing through said slot;
   tape receiving means mounted in said housing for receiving said tape;
   lock means for releasably maintaining said tape in a fixed position through said slot and slidably movable between an upper release position and a lower lock position, said lock means forming a portion of the front wall of said housing; and
   means for biasing said lock means to said release position;
   said lock means including a manually operable thumb engaging portion, a wall portion extending downwardly from said thumb engaging portion and pressure regulator means for regulating the locking pressure on said tape by said lock means, wherein said pressure regulator means, said wall portion and said thumb engaging portion integrally form said lock means.

10. The tape measure as defined in claim 9 and further comprising an extension extending rearwardly from the wall portion of said lock means, said rearward extension forming a spring seat.

11. The tape measure as defined in claim 9 wherein said pressure regulating means includes two resiliently flexible straps integrally formed with said wall portion of said lock means connecting a tape engaging bottom end with said wall portion.

* * * * *